United States Patent
Zhu et al.

(10) Patent No.: US 10,315,499 B2
(45) Date of Patent: *Jun. 11, 2019

(54) DUCTLESS COOLING SYSTEM FOR A VEHICLE POWER STORAGE UNIT

(71) Applicant: Ford Global Technologies, LLC, Dearborn, MI (US)

(72) Inventors: Douglas Zhu, Chandler, AZ (US); Sarav Paramasivam, South Lyon, MI (US); Dharmendra Patel, Canton, MI (US); Patrick Maguire, Ann Arbor, MI (US); Kanghua Chen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

This patent is subject to a terminal disclaimer.

(21) Appl. No.: 14/846,057

(22) Filed: Sep. 4, 2015

(65) Prior Publication Data
US 2015/0375608 A1    Dec. 31, 2015

Related U.S. Application Data

(63) Continuation of application No. 11/755,296, filed on May 30, 2007, now Pat. No. 9,126,477.

(51) Int. Cl.
*B60K 1/04* (2019.01)
*B60N 2/64* (2006.01)
*B60N 2/56* (2006.01)
*B60K 1/00* (2006.01)

(52) U.S. Cl.
CPC .............. *B60K 1/04* (2013.01); *B60N 2/5621* (2013.01); *B60N 2/646* (2013.01); *B60K 2001/005* (2013.01); *B60K 2001/0416* (2013.01)

(58) Field of Classification Search
CPC ......................................................... B60K 1/04
See application file for complete search history.

(56) References Cited

U.S. PATENT DOCUMENTS

| | | |
|---|---|---|
| 4,304,314 A | 12/1981 | Sakaguchi et al. |
| 4,376,408 A | 3/1983 | Iijima et al. |
| 5,937,664 A | 8/1999 | Matsuno et al. |
| 6,188,574 B1 | 2/2001 | Anazawa |
| 6,220,383 B1 | 4/2001 | Muraki et al. |
| 6,662,891 B2 | 12/2003 | Misu et al. |
| 6,902,020 B2 | 6/2005 | Kronner et al. |
| 6,931,878 B2 | 8/2005 | Kubota et al. |

(Continued)

FOREIGN PATENT DOCUMENTS

| | | |
|---|---|---|
| JP | 2006335243 A | 12/2006 |
| JP | 2007008443 A | 1/2007 |
| JP | 2007022350 A | 2/2007 |

*Primary Examiner* — James A Shriver, II
*Assistant Examiner* — James J Triggs
(74) *Attorney, Agent, or Firm* — David B. Kelley; Brooks Kushman P.C.

(57) ABSTRACT

A vehicle includes a floor, a seat including a back, and a traction battery module located behind the seat. The seat and floor form an air passageway, underneath the seat, from a cabin to the traction battery module. The vehicle also includes a plenum disposed between the air passageway and fraction battery module, and a sealing member fixed to the plenum and configured to engage the back to form a substantially airtight seal therebetween.

11 Claims, 4 Drawing Sheets

(56) References Cited

U.S. PATENT DOCUMENTS

| | | |
|---|---|---|
| 6,978,855 B2 | 12/2005 | Kubota et al. |
| 7,240,752 B2 | 7/2007 | Takahashi et al. |
| 7,419,209 B1 * | 9/2008 | Mangiapane ...... B60H 1/00278 180/65.1 |
| 7,637,335 B2 | 12/2009 | Hayashi |
| 7,654,351 B2 | 2/2010 | Koike et al. |
| 9,126,477 B2 * | 9/2015 | Zhu ......................... B60K 1/04 |
| 2001/0030069 A1 | 10/2001 | Misu et al. |
| 2004/0041431 A1 | 3/2004 | Ito et al. |
| 2005/0011692 A1 | 1/2005 | Takahashi et al. |
| 2007/0040418 A1 | 2/2007 | Ohkuma et al. |

\* cited by examiner

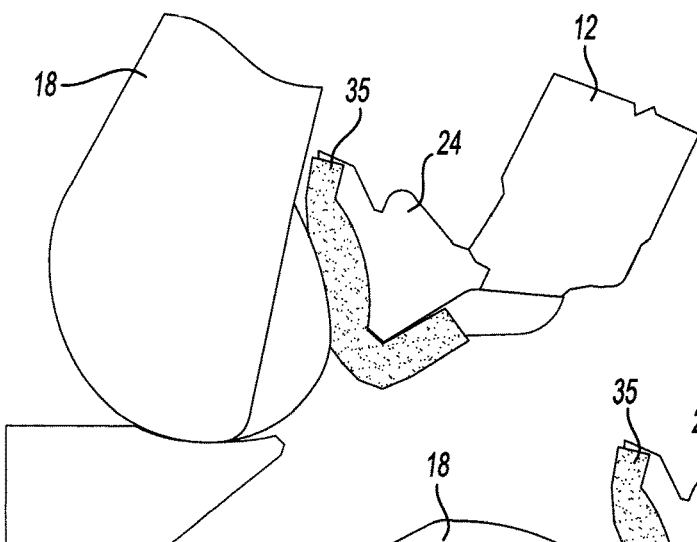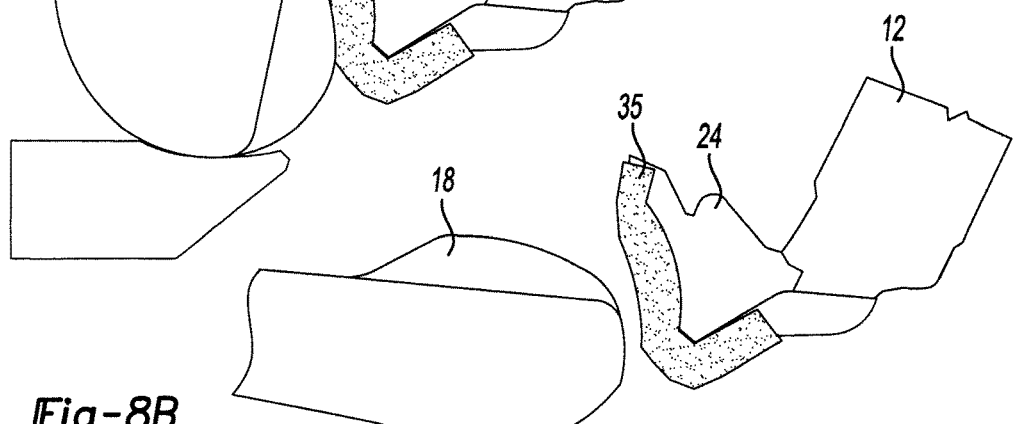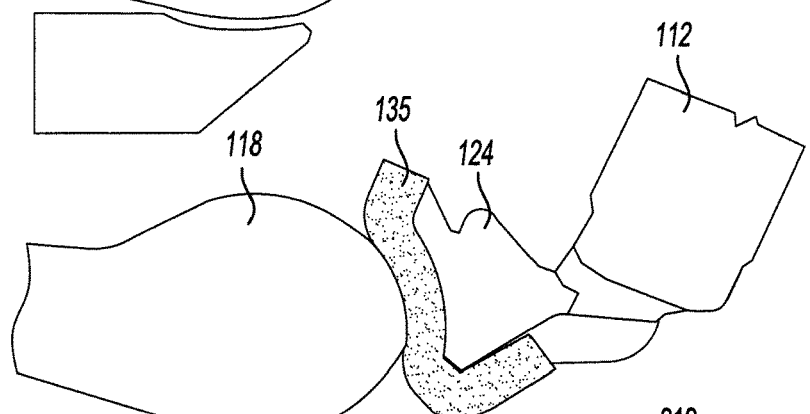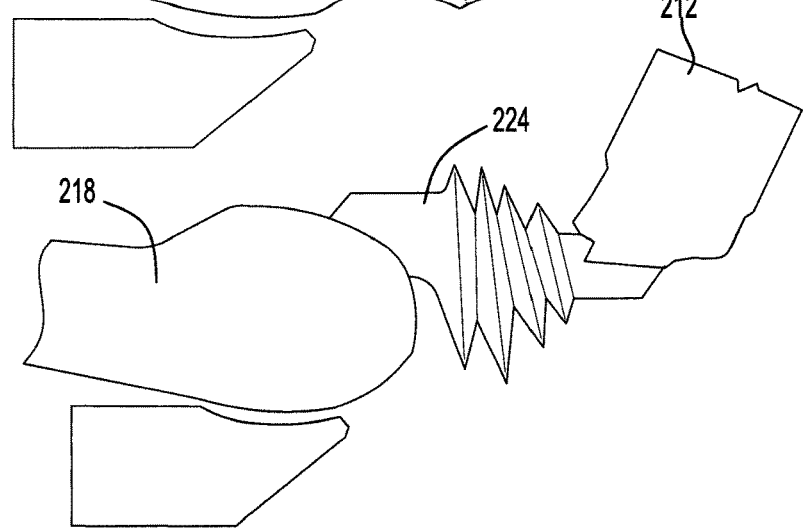

DUCTLESS COOLING SYSTEM FOR A VEHICLE POWER STORAGE UNIT

CROSS-REFERENCE TO RELATED APPLICATION

This application is a continuation of application Ser. No. 11/755,296, filed May 30, 2007, the disclosure of which is hereby incorporated in its entirety by reference herein.

TECHNICAL FIELD

The disclosure relates to ductless cooling systems for vehicle power storage units.

BACKGROUND

A battery for a Hybrid Electric Vehicle (HEV) may require cooling during usage. Some HEVs use chilled air from a dedicated air conditioning unit. Other HEVs use fresh air from outside the vehicle. Still other HEVs use air from the cabin via a duct located on a side of the rear seat or in a package tray.

SUMMARY

Certain embodiments may take the form of a system for delivering air from a vehicle cabin to a vehicle power storage unit. The system includes a floor, a vehicle seat, and a power storage unit to provide power to move the vehicle. The vehicle seat and floor define an air passageway, underneath the vehicle seat, from the vehicle cabin to the power storage unit.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 8A is a side elevation view of the rear seat, seal, and inlet plenum of FIG. 1, and shows the seat in the upright position and sealed with the seal.

FIG. 8B is another side elevation view of the rear seat, seal, and inlet plenum of FIG. 8A, and shows the rear seat in the folded position and not sealed with the seal.

FIG. 8C is a side elevation view of an alternative embodiment of the rear seat, seal, and inlet plenum, and shows the rear seat in the folded position and sealed with the seal.

FIG. 8D is a side elevation view of another alternative embodiment of the rear seat and inlet plenum, and shows the rear seat in the folded position and attached with the inlet plenum.

DETAILED DESCRIPTION

A dedicated air conditioning unit to cool a traction battery may be expensive and reduce cargo volume. Introducing fresh air from outside a vehicle to cool a traction battery may present water and dust management issues. Using cabin air to cool a fraction battery delivered via ducts located on the side of rear seats may present space, ingress/egress, complexity, and occupant comfort issues. Similarly, ducts passing through a package tray may pass directly under a rear window glass and may be subject to preheating from a solar load. Additionally, ducts require clearances and reduce volume due to duct thickness.

Some embodiments of the invention provide a ductless cooling system that draws air from the vehicle cabin to cool the battery. A physical inlet duct is not required. Instead, the rear seat and the floor form a chamber for the inlet air stream. The air is drawn underneath the rear seat, through an inlet plenum connecting the seat to the battery, to cool the cells. The warm air, after the heat exchange, is then drawn by a fan and discharged from the battery system to an open volume such as the vehicle trunk, vehicle outside, or other desirable space.

The inlet plenum may impede recirculation of air from the trunk to the inlet of the air stream. Sealing features, such as an oversized foam seal disposed along the interface between the inlet plenum and the seat back, may allow simple seat assembly and be designed to work, and seal, with a foldable back. As such, portions of the foldable seat may be contoured, at the interface with the inlet plenum, to promote such sealing. For example, a parabolic or circular interface seat surface may be used such that each radius in the seat curvature separates quickly from the inlet plenum to minimize the shear between the foam and back as the seat is rotated.

Seat cushions may taper at the interface with the seat back. The tapers may provide a seal to reduce air leakage from the sides of the seat and also force the air to come from the front of the seat.

The ductless cooling system may support the seat cushion without affecting the seat comfort or H-point. The system may provide an air space underneath the seat, an air inlet to allow air to enter the air space from the cabin, proper support that ensures customer comfort when seated, and a dust/moisture filter or screen mesh to reduce the amount of dust/moisture entering the air space.

The support for the cushion may be provided via a seat cushion wire structure, a bridge form, plastic or metal, to transfer the cushion loads to the floor, or support ribs that pass through an air cavity and serve as flow guiding vanes.

Figure 1:
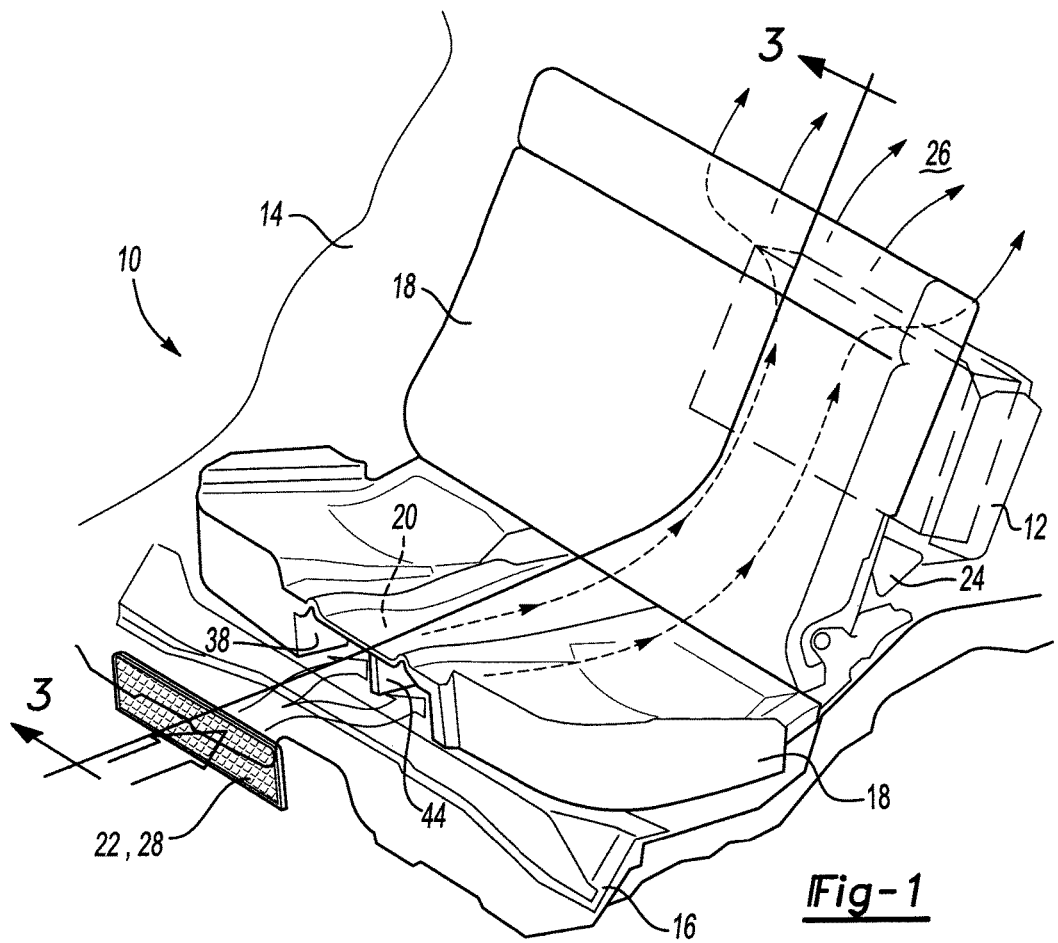
FIG. 1 is a front perspective view, partially exploded, of portions of a cooling system for a traction battery module of a vehicle, and shows the pathway for air, indicated by dotted line arrow, from the vehicle cabin to the traction battery module.

FIG. 1 is a front perspective view, partially exploded, of portions of cooling system 10 for traction battery module 12 of vehicle 14 showing the path of air, indicated by dotted line arrow, from the vehicle cabin to traction battery module 12. Portions of floor 16 and rear seat 18 form enclosure 20 under rear seat 18. Enclosure 20 provides an air passageway for air to travel, as indicated by dotted line arrow, from the vehicle cabin to traction battery module 12. As explained below, air travels under seat 18 and into traction battery module 12.

Figure 2:
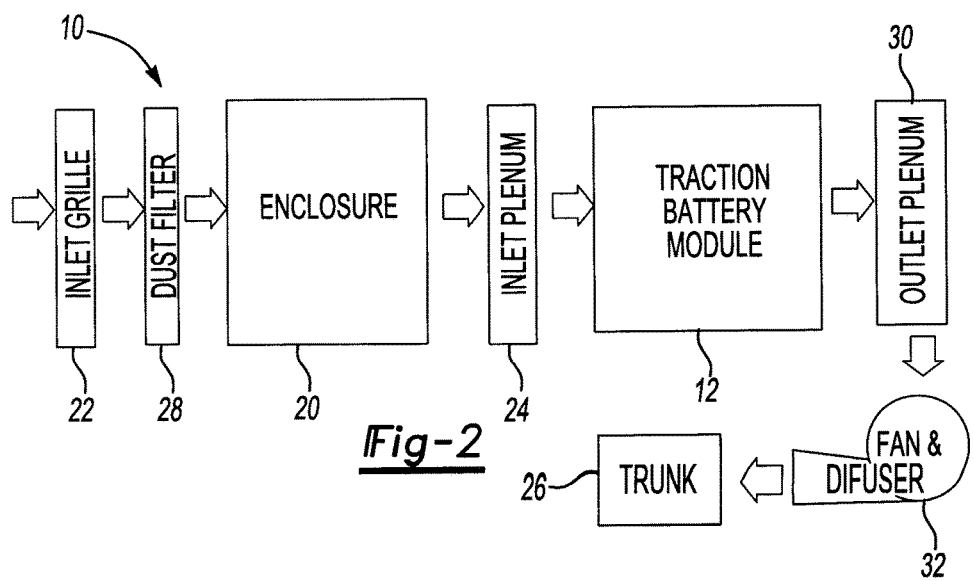
FIG. 2 is a block diagram of the cooling system of FIG. 1 and shows the pathway for air, indicated by arrow, from the vehicle cabin to the trunk.

FIG. 2 is a block diagram of cooling system 10 of FIG. 1 showing the pathway for air, indicated by arrow, from the vehicle cabin to trunk 26. Air travels first through inlet grille 22, which obscures occupant view of dust filter 28 and enclosure 20, and into enclosure 20 under seat 18. Inlet plenum 24 directs the air from enclosure 20 to traction battery module 12 where it cools the traction battery. Outlet plenum 30 directs the air from traction battery module 12 to fan 32. Fan 32 blows the air into trunk 26.

In some embodiments fan 32 may be used to pull air from the vehicle cabin to traction battery module 12 through enclosure 20. Fan 32 may be located before or after traction battery module 12. Fan 32 may also be located in traction battery module 12. In other embodiments fan 32 may be absent. In still other embodiments, other portions of system 10, e.g., dust filter 28, plenums 24, 30, etc., may be absent.

Figure 3:
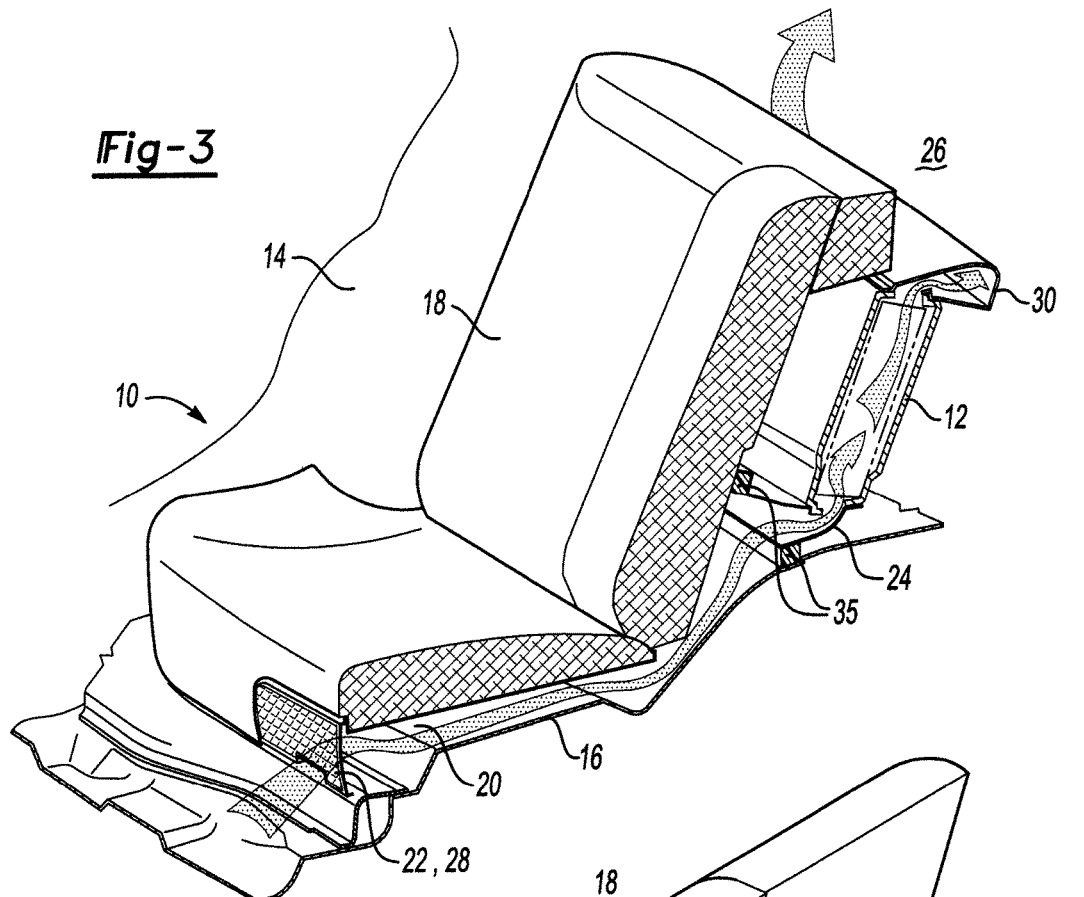
FIG. 3 is a front perspective view, in cross-section, of portions of the cooling system of FIG. 1 taken along section line 3-3 of FIG. 1, and shows the pathway for air, indicated by arrow, from the vehicle cabin, through the enclosure, inlet plenum, and traction battery module, to the trunk.

FIG. 3 is a front perspective view, in cross-section, of portions of cooling system 10 of FIG. 1 taken along section line 3-3 of FIG. 1 showing the pathway for air, indicated by arrow, from the vehicle cabin, through enclosure 20, inlet plenum 24, and traction battery module 12, to trunk 26. As discussed above, air may be pulled or pushed from the vehicle cabin by fan 32 (FIG. 2), if present and depending on its location, or air may be forced into cooling system 10 by a vehicle climate control system (not shown).

Figure 4:
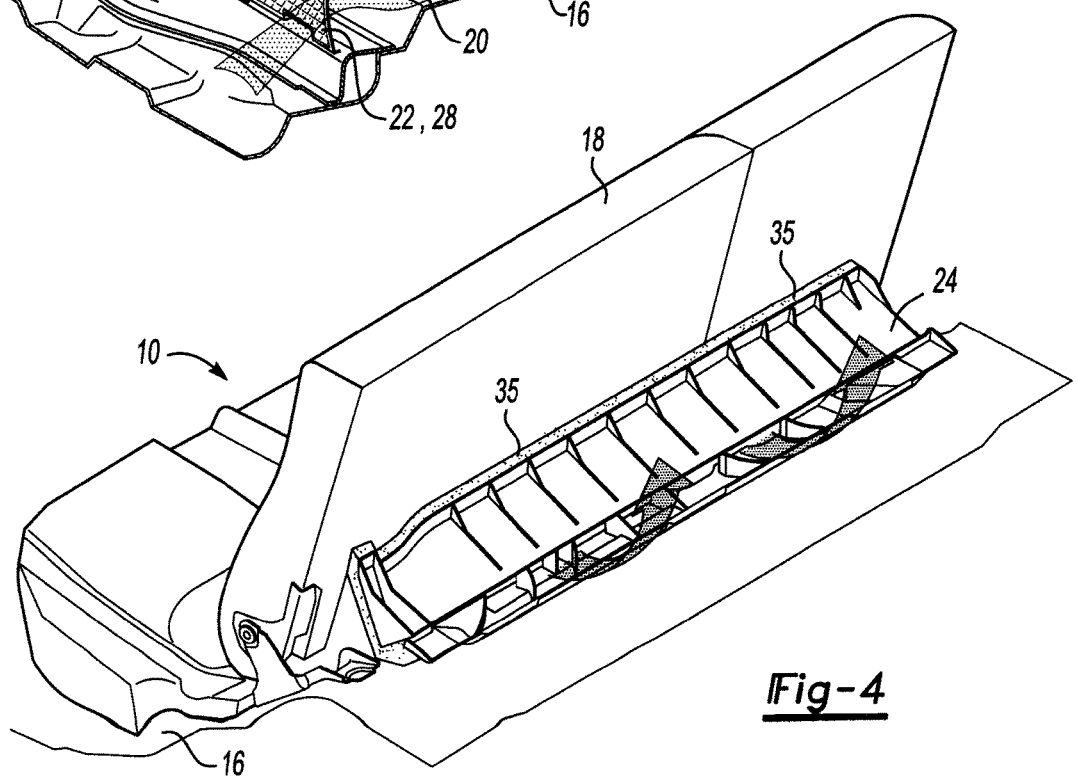
FIG. 4 is a rear perspective view of portions of the cooling system of FIG. 1, and shows air, indicated by arrow, exiting the inlet plenum.

FIG. 4 is a rear perspective view of portions of cooling system 10 showing air, indicated by arrow, exiting inlet plenum 24. Inlet plenum 24 includes seal 35. Seal 35 may be a soft, flexible material, e.g., foam, capable of producing a substantially airtight seal between inlet 24 and its interfacing parts. In the embodiment of FIG. 4, seat 18 is in the upright position and inlet plenum 24 seals against rear seat 18. Inlet plenum 24 also seals against floor 16 via seal 35. As such, a substantially air tight seal exists between enclosure 20 and inlet plenum 24. Inlet plenum is mechanically connected, e.g., bolted, with traction battery module 12 such that a generally air tight seal exists between inlet plenum 24 and traction battery module 12. In other embodiments, inlet plenum 24 may be attached with traction battery module 12 in any desired fashion, e.g., adhered, bonded. A foam seal may also be placed between inlet plenum 24 and traction battery module 12.

Figure 5:
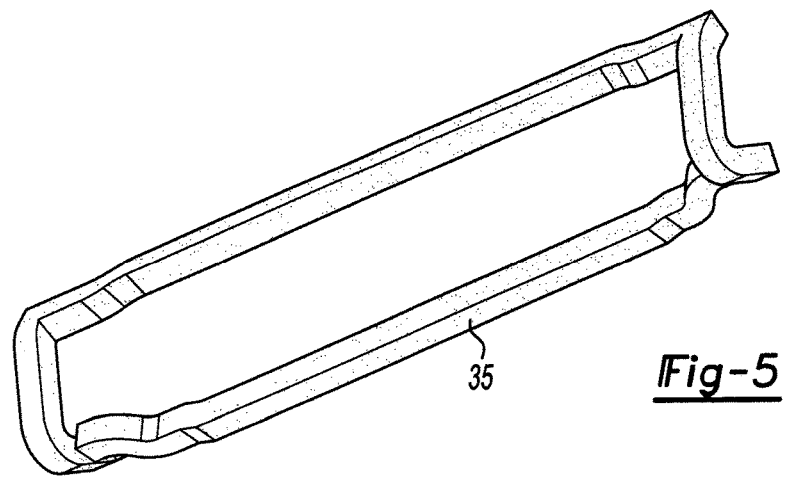
FIG. 5 is a front perspective view of the seal of FIG. 4 associated with the inlet plenum.

FIG. 5 is a front perspective view of seal 35 of FIG. 4 associated with inlet plenum 24. In other embodiments, seal 35 may have a different shape or design depending on the shape or design of inlet plenum 24, if present, and its interfacing parts.

Figure 6:
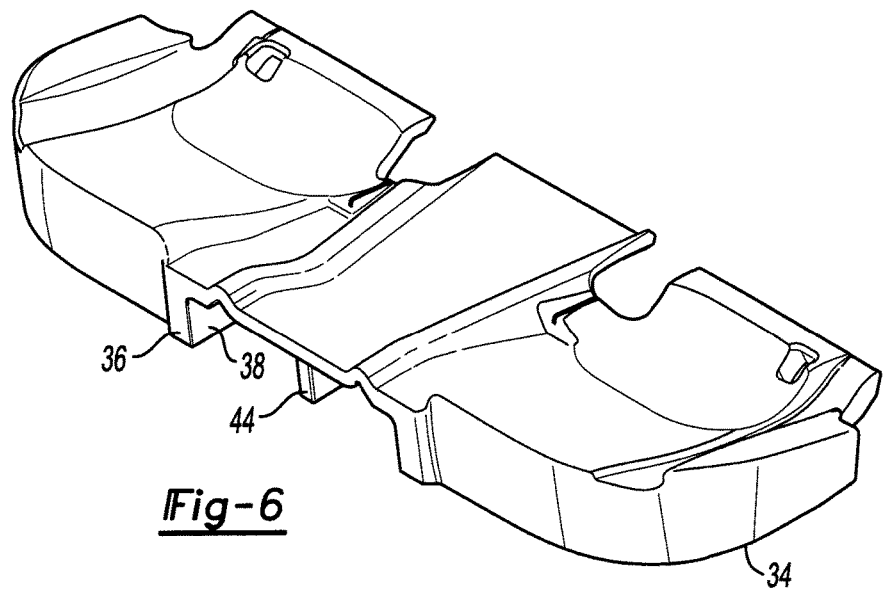
FIG. 6 is a top perspective view of the support of the rear seat of FIG. 1.

FIG. 6 is a top perspective view of support 34 of rear seat 18 of FIG. 1. Support 34 forms the understructure for rear seat 18 on which cushion material (not shown) may be placed. Support 34 includes opening 36 which provides the inlet for air from the vehicle cabin into enclosure 20. Inlet grille 22 and dust filter 28 (FIG. 2) cover opening 36 to prevent unobstructed flow of air from the vehicle cabin to enclosure 20. Support 34 may be made, formed, or molded in any conventional fashion.

Figure 7:
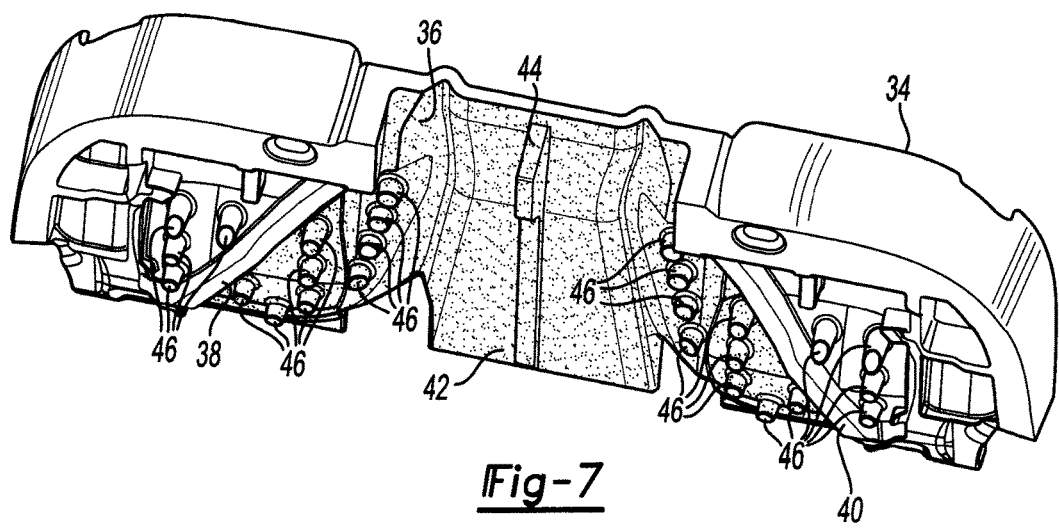
FIG. 7 is a bottom perspective view of the support of FIG. 6 and shows portions of the enclosure, as indicated by speckling, defined by the support.

FIG. 7 is a bottom perspective view of support 34 of FIG. 6 showing portions of enclosure 20, as indicated by speckling, defined by support 34. The sides of enclosure 20 are defined by air passage walls 38, 40. The top of enclosure 20 is defined by upper air passage surface 42. In the embodiment of FIG. 7, air passage walls 38, 40, upper air passage surface 42, and floor 16 cooperate to define enclosure 20 under rear seat 18. Divider 44 transfers occupant loads from rear seat 18 to floor 16 as well as promotes the desired air flow through enclosure 20. Support structures 46 within enclosure 20, likewise, transfer occupant loads from rear seat 18 to floor 16 as well as promote the desired air flow through enclosure 20. Support structures 46 outside of enclosure 20 transfer occupant loads from rear seat 18 to floor 16. Support structures 46, in the embodiment of FIG. 7, have a conical shape. In other embodiments, support structures 46 may have any desired shape, e.g., rib, pillar, etc.

FIG. 8A is a side elevation view of rear seat 18 having a parabolic shape, seal 35, and inlet plenum 24 showing seat 18 in the upright position. As described above, if seat 18 is in the upright position, seal 35 of inlet plenum 24 seals against rear seat 18.

FIG. 8B is another side elevation view of rear seat 18, seal 35, and inlet plenum 24 of FIG. 8A showing rear seat 18 in the folded position. In the folded position, rear seat 18 does not seal against seal 35 of inlet plenum 24. As such, air from the vehicle cabin may flow directly into inlet plenum 24 and thus traction battery module 12.

FIG. 8C is side elevation view of an alternative embodiment of rear seat 118, seal 135, and inlet plenum 124 showing rear seat 118 in the folded position. Portions of rear seat 118 have a circular shape with the center of rotation for the seat back being the center of the circular shape such that if rear seat 118 is in the folded position, seal 135 of inlet plenum 124 seals against rear seat 118.

FIG. 8D is a side elevation view of another alternative embodiment of rear seat 218 and inlet plenum 224 showing rear seat 218 in the folded position and attached, e.g., bolted, with inlet plenum 224. Inlet plenum 224 has an accordion-like configuration that permits it to extend and retract as rear seat 218 moves between the upright and stowed positions while maintaining its seal with rear seat 218.

Certain embodiments may enable cabin air to be delivered to a battery system, reduce cost and weight required to route air to a battery system, and reduce the number of parts and labor associated with assembly processes. Certain embodiments may also occupy less volume resulting in increased room for airflow and seat cushions and are robust to floor dimensional variation caused by, for example, the presence of dampening materials.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle comprising:
   a floor;
   a seat including a back;
   a traction battery module located behind the seat, the seat and floor forming an air passageway, underneath the seat, from a cabin to the traction battery module;
   a plenum, having a bellows configuration, disposed between the air passageway and traction battery module; and
   a sealing member fixed to the plenum and back to form a substantially airtight seal therebetween.

2. The vehicle of claim 1, further comprising an outlet plenum associated with the traction battery module and configured to direct air from the traction battery module to a trunk.

3. The vehicle of claim 1, further comprising a fan configured to draw air from the cabin to the traction battery module via the air passageway.

4. A vehicle comprising:
a floor;
a seat including a back;
a traction battery module located behind the seat, the seat and floor forming an air passageway, underneath the seat, from a cabin to the traction battery module;
a plenum arranged between the back and traction battery module to form an airtight seal therebetween; and
an outlet plenum, associated with the traction battery module, configured to direct air from the traction battery module to a trunk.

5. The vehicle of claim 4, further comprising a fan configured to draw air from the cabin to the traction battery module via the air passageway.

6. The vehicle of claim 4, wherein the plenum has a bellows configuration.

7. The vehicle of claim 4, wherein the plenum includes a sealing member to engage the back.

8. A vehicle comprising:
a floor;
a seal including a back moveable between upright and stowed positions;
a traction battery module located behind the seat, the seat and floor forming an air passageway, underneath the seat, from a cabin to the traction battery module;
a plenum disposed between the air passageway and traction battery module; and
a sealing member fixed to the plenum and configured to engage the back to form a substantially airtight seal therebetween when the back is in the upright and stowed positions.

9. The vehicle of claim 8, wherein the sealing member is further configured to engage the floor to form a substantially airtight seal between the plenum and floor.

10. The vehicle of claim 8, further comprising an outlet plenum associated with the traction battery module and configured to direct air from the traction battery module to a trunk.

11. The vehicle of claim 8, further comprising a fan configured to draw air from the cabin to the traction battery module via the air passageway.

* * * * *